March 5, 1946.  G. J. FRISCHMANN ET AL  2,396,002
WELDER
Filed Jan. 22, 1942  6 Sheets-Sheet 1

Fig. 1.

INVENTORS
George J. Frischmann and
Carl F. Brunner
BY
George T. Gill
ATTORNEY Patented Mar. 5, 1946

2,396,002

UNITED STATES PATENT OFFICE 2,396,002

WELDER

George J. Frischmann, Queens Village, and Carl F. Brunner, Woodhaven, N. Y., assignors to Metropolitan Engineering Company, Brooklyn, N. Y., a corporation of New York Application January 22, 1942, Serial No. 427,730

14 Claims. (Cl. 219—4)

The invention herein disclosed relates to a welder that is suitable for carrying out the welding process commonly known as electric resistance welding.

Welds of the kind mentioned are effected by utilizing the electrical resistance of the metal pieces to be welded to effect the heating of the pieces, in the weld area. The pieces are first brought into contact and a heavy electric current is caused to flow between the pieces, a current of such magnitude that the pieces are heated in the weld area to a point where the metal becomes plastic. The pieces are then moved together under heavy pressure to cause the metal of each piece to flow into and become ingrained in the other. A machine for effecting such welds should, for the repeated production of satisfactory welds, be so arranged and constructed to effect an accurate relation between the pieces to be welded with a uniform pressure thereon so that the current density throughout the weld area may be controlled to effect the proper rate of heating. In addition the pressure exerted on the pieces should be closely controlled in relation to the progress of the welding operation.

An object of this invention is to provide a machine of this kind in which relatively movable electrode holders are accurately and definitely related in all positions of their relative movement. Another object of the invention is to provide a machine of this kind in which the pressure exerted on pieces being welded may be accurately controlled and varied in relation to the progress of the welding operation. A further object of the invention is to provide a machine of this kind suitable for automatic control during the welding operation. Another object of the invention is to provide a machine of this kind having automatic controls.

The foregoing objects, and certain advantages inherent in this invention, are realized in the embodiment of the invention illustrated as an example in the accompanying drawings and described in detail below. The drawings include.

In general, the welder illustrated in the drawings includes a frame that supports the operative mechanism and the transformer which supplies the welding current. There are two electrode holders or shoes which are relatively movable. To these electrode shoes, suitable electrodes are secured, the electrodes being such that they engage one surface of each of the pieces to be welded, except in the weld area. When the pieces to be welded are arranged in the welder so as to be engaged by the electrodes, the electrode shoes are moved relatively to effect a pressure engagement of the pieces. The welding current is then supplied to the electrodes and the pieces therebetween are in the circuit. As the metal of the pieces becomes plastic from the heat generated by the passage of the weld current therethrough the electrode shoes move closer together and additional pressure is exerted on the electrode shoes to cause the metal of each piece to flow into, become ingrained in and coalesce with the other. Movement of the electrode shoes towards each other is limited to determine the size of the welded piece and the extent of flow of the metal of the pieces. As the weld is effected, the welding current is cut off and the electrode shoes continue to move toward each other under increased pressure until further motion is prevented by the size determining stops. After a slight time delay during which the above motion is completed and the metal begins to cool, the electrode shoes are moved away from each other to allow removal of the welded piece.

The particular embodiment of the invention illustrated in the drawings include a base or frame I on which the electrode shoes and the operating parts of the machine are mounted. This base includes an extension 2 which serves to support a transformer 3 from which the welding current is supplied to the electrodes. The hydraulic system through which movement of the electrode shoe is effected and which includes a reservoir, pump and magnetically operated valves is built as a unit and placed behind the welder; it is connected to the welder by flexible, high pressure "Neoprene" hose.

Mounted directly upon the frame I is a bed plate 4. This bed plate is provided with four shoulder bushings 5, arranged at the corners of a square. The plate is bored to have openings aligned with the bushings. Mounted on the bed plate and secured thereto, and electrically insulated therefrom there is an electrode shoe 6 which is within the square at the corners of which the shoulder bushings 5 are located. The electrode shoe receives an electrode 7, the lower electrode, which is secured therein by a wedge 8. The electrode shoe also carries guide pins 9 which extend therefrom and which are electrically insulated from the electrode shoe. Held in place by these guide pins, there are size blocks 10, one on either side of the electrode shoe. These size blocks are made of electrical insulating material and serve to limit the extent of movement of the electrodes towards each other.

Slidably mounted in each of the shoulder bushings 5 there is a guide post 11. At the upper end, there is secured to the guide posts a ram plate 12. This ram plate is securely fastened to the guide posts adjacent the upper end of the guide posts. The top plate carries an electrode shoe 13, insulated therefrom, in which is mounted the upper electrode 14, secured therein by a wedge 15. The lower electrode is connected to one side of the secondary of the transformer 3. A connector connected to the upper electrode shoe 13 carries contact blades 16 which in the down position of the upper electrode engages with contact blades 17 connected with the other side of the secondary of the transformer 3.

Figure 1:
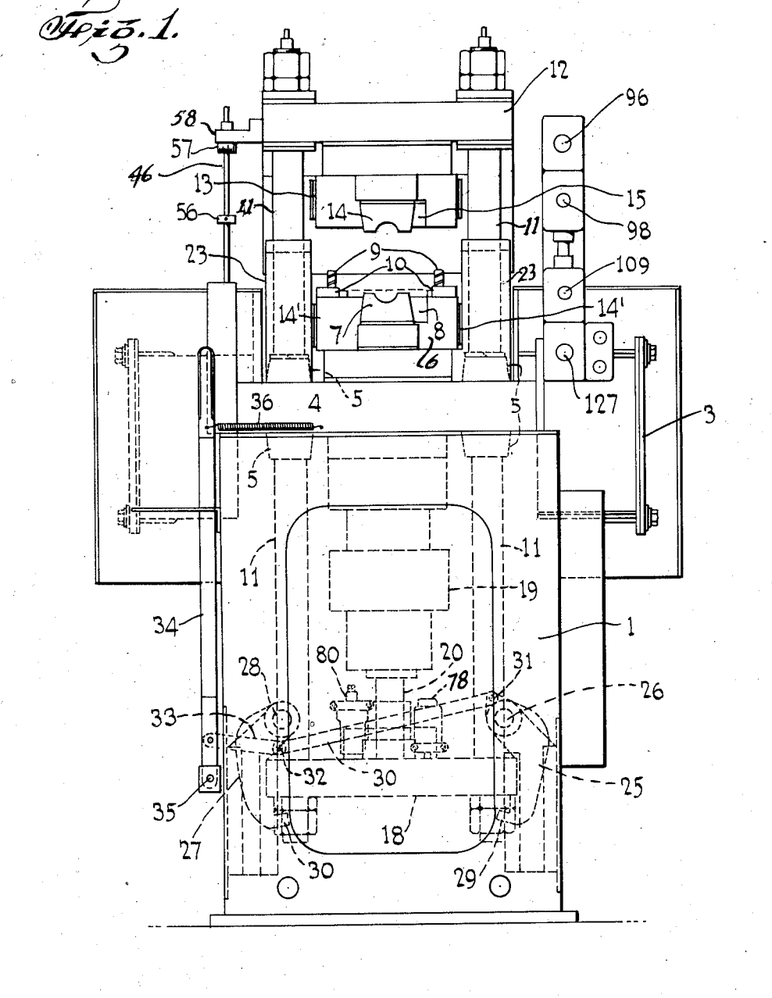
Fig. 1 which is a front elevation of a welder embodying the invention.
Figure 3:
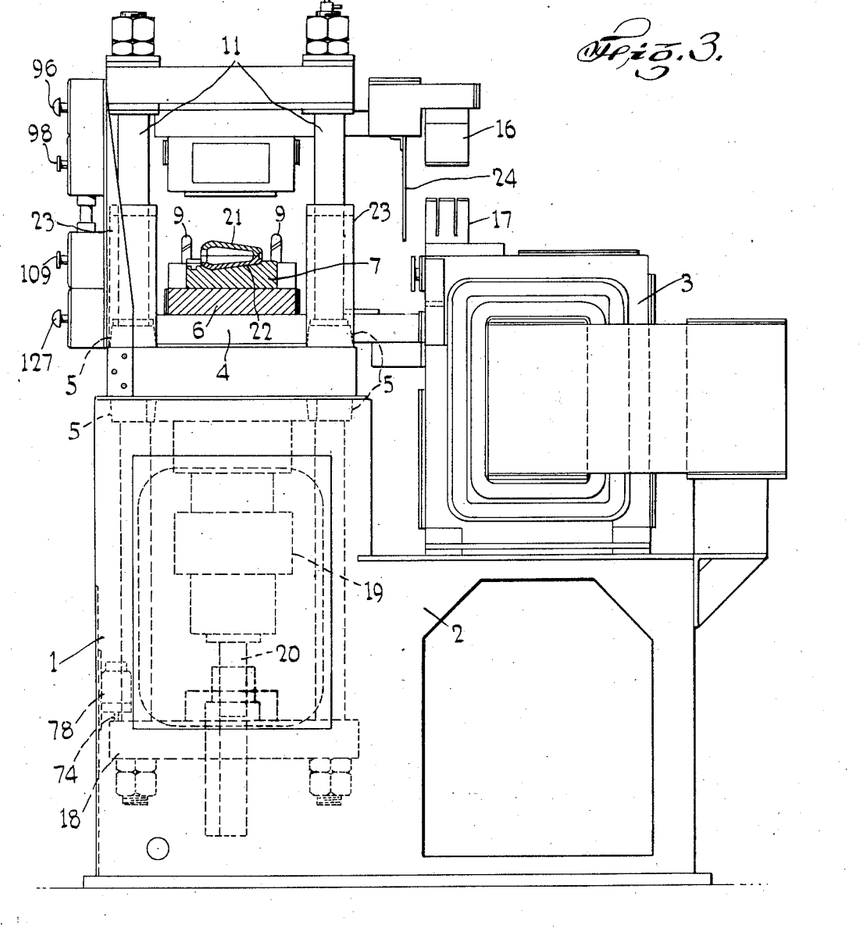
Fig. 3 which is a side elevation, partly in section of the same.

The guide posts 11 extend through the shoulder bushings in the bed plate and into the base 1. At their lower ends, the guide posts 11 are firmly secured to a bottom plate 18. Within base 1 a hydraulic cylinder 19 is mounted. This hydraulic cylinder extends from the bed plate 4 on which it is mounted within the base so that the axis thereof is aligned with the center of the bottom plate 18. Within the cylinder, there is a piston that is connected to a piston rod 20 extending through the lower end of the cylinder 19 and connected to the bottom plate 18. By admitting fluid under pressure to the top of the cylinder, as seen in Figs. 1 and 3, the bottom plate 18 is forced downwardly. On moving downwardly, the bottom plate moves the guide posts to which the ram plate, upper electrode shoe and upper electrode are secured. When the upper electrode is thus moved down and two pieces to be welded between upper and lower electrodes are engagd, the pressure on the piston within the cylinder 19 will determine the pressure exerted between the pieces engaged by the electrodes. The particular electrodes illustrated are for the purpose of welding two halves, 21 and 22 of a hollow article. Such an article is shown within the welder in Fig. 3. It will be noted that each electrode is provided with a depression which receives one of the pieces to be welded and makes electrical contact with the entire outer surface thereof except in the area of the weld.

Each guide post is provided with a fiber boot 23 that extends from the upper edge of the shoulder bushing in the bed plate to a point beyond the plane of the weld. When a weld is effected, a flash occurs and the boots 23 serve to protect the guide posts from the heat of the flash and metal particles that are carried by the flash. These boots may have metal facings at the point or area where they are struck by the flash. The contact blades 16 and 17 are likewise shielded from the flash by a flash shield 24 that is secured to and depends from the contact plate of the upper contact 16. Preferably, the rear guide posts are water cooled. To this end, each of these guide posts may be bored and a tube of lesser diameter than the bore inserted therein axially thereof so that there is an annular space formed between the tube and the wall of the bore in the guide post. Water admitted through the tube will pass down the tube and up the annular space. The desirability of water cooling the rear posts is primarily because of the heating due to eddy currents induced therein by the flow of the welding current through the connectors and between the rear guide posts.

To prevent the accidental downward movement of the upper electrode, even though pressure may be applied to the upper end of the cylinder, a safety lock is provided. This safety lock includes a hook-shaped element 25 that is pivotally secured to the frame or base 1 on a pivot 26. A like hook-shaped element 27 is pivotally secured to the frame at 28. The hook-shaped elements 26 and 27 are on opposite sides of the bottom plate 18 and include end sections 29 and 30 respectively which normally extend under the bottom plate. The elements 25 and 27 are connected together by a link 30. At one end, this link 30 is pivoted, as at 31, to the hook-shaped element 25, above the pivot axis 26. The other end of the link 30 is pivotally secured to the element 27 at a point 32 below the pivot axis 28. Also secured to the pivot 32 is one end of a link 33, the other end of which is secured to an operating handle or lever 34. The lower end of the operating handle is pivoted to the frame at 35. A spring 36 serves to normally maintain the handle 34 in the position in which the ends 29 and 30 of the elements 25 and 27 extend under the bottom plate 18. When the operating handle is moved against the action of the spring, to the left as seen in Fig. 1, the hook-shaped elements 25 and 27 are swung about their pivotal connections to the frame, outwardly, to remove the end sections 29 and 30 from the path of the bottom plate 18.

Figure 4:
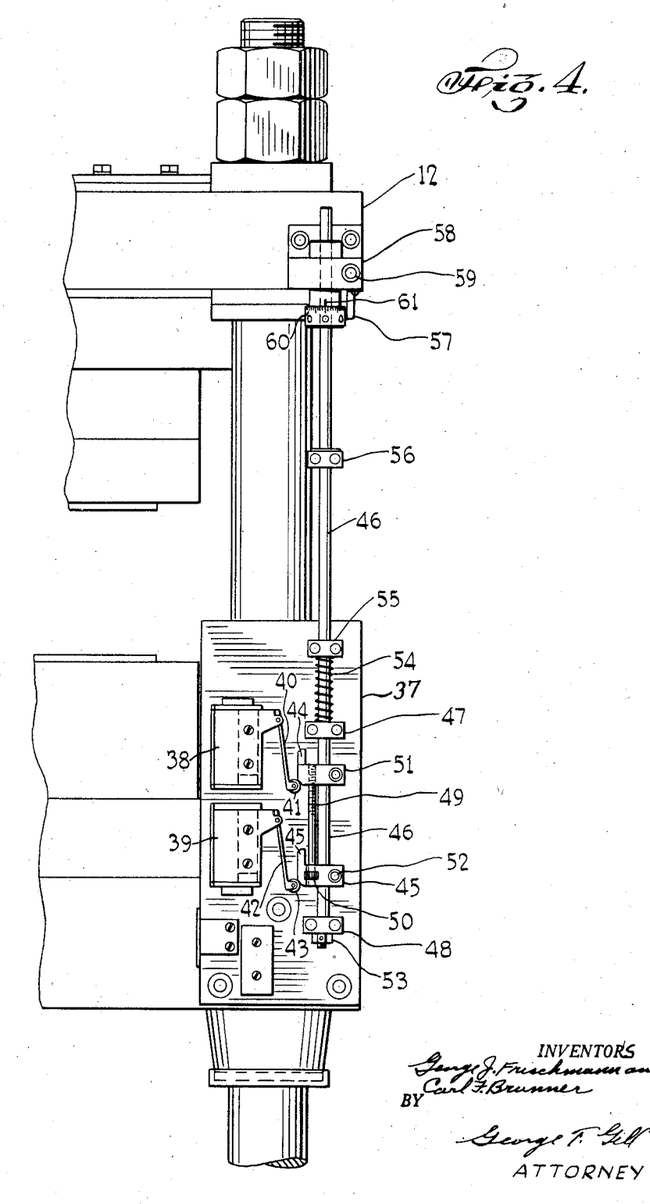
Fig. 4 which is an enlarged fragmentary side elevation illustrating the control rod and associated mechanism.

Secured on the side of the machine (Fig. 4), there is a mounting panel 37 on which there are mounted two limit switches, 38 and 39. Limit switch 38 is provided with a pivotally mounted lever 40 which carries a cam follower 41. A like pivotally mounted lever 42 is carried by the limit switch 39 and this lever has mounted thereon a cam follower 43. The switch lever 40 is actuated by a control cam 44 and the switch lever 42 is actuated by a control cam 45. These control cams are mounted upon and secured to a control rod 46 that is slidably mounted in bearings 47 and 48 secured on the mounting panel. Extending between the cams 44 and 45 there is an adjusting screw 49. This adjusting screw is journaled in the cam 45 and secured against longitudinal movement with respect to the cam 45. On the adjusting screw, and extending through slots in the cam 45, there is a knurled wheel 50. The adjusting screw is threaded into the cam 44. Each of these cams is secured in position on the control rod by a locking screw, the locking screw 51 serving to secure the cam 44 and the locking screw 52 serving to secure the cam 45. By loosening the locking screws, one or both, and turning the knurled wheel 50, the relative position of the cams 44 and 45 on the control rod may be adjusted to affect the relative operation of the switches 38 and 39 with respect to the position of the control rod.

On the end of the control rod, there is provided a stop nut 53 which, by engagement with the bearing 48, limits the upward movement of the control rod. The control rod is resiliently urged in an upward direction by a spring 54 that acts between the bearing 47 and a collar 55 secured on the control rod. Above the collar 55, an adjustable operating collar 56 is secured to the operating rod. The upper end of the operating rod extends through and is slidable in an adjusting screw 57 that is threaded into an L-shaped bracket 58 secured to the ram plate 12. The bracket 58 is split at the opening in which the adjusting screw 57 is received. In this way, it forms a clamp for the adjusting screw which may be tightened or loosened by a bolt 59. The head of the adjusting screw is provided with graduations 60 that may be read against a mark 61 on the bracket 58. The bottom of the head of the adjusting screw 57 engages, in the downward movement of the plate 12, the operating collar 56 to move the control rod downwardly and so effect actuation of the limit switches 38 and 39. With the operating collar 56 a rough adjustment may be obtained for the operation of the limit switches with respect to the relative position of the electrodes. With the adjusting screw 57, a very fine and close adjustment may be obtained. The switches 38 and 39 are control switches for controlling the action of the hydraulic system utilized for effecting operation of the welder.

Figure 5:
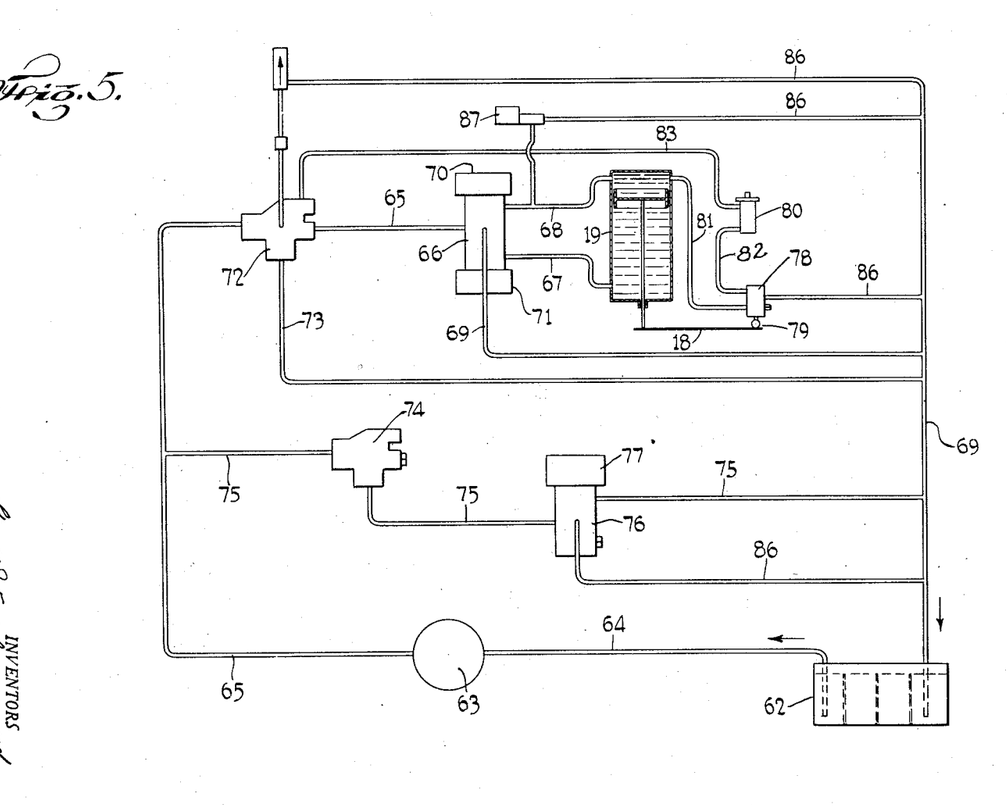
Fig. 5 which is a diagrammatic illustration of the hydraulic system.

The hydraulic system utilized is illustrated in Fig. 5 of the drawings. This hydraulic system (Fig. 5) includes a fluid reservoir, in this instance an oil tank 62. To this oil tank the inlet or low pressure side of a constant delivery pump 63 is connected by means of a pipe 64. The outlet or pressure side of the pump 63 is connected by a pipe line 65 to an electrically operated, four-way valve 66. One outlet of the four-way valve is connected by a pipe 67 to the lower end of the cylinder 19, another outlet from the valve 66 is connected by a pipe 68 to the upper end of the cylinder 19, and a further outlet is connected by a pipe line 69 to the tank 62. These four-way valves are common and well known in the art. When a solenoid 70 is energized, the valve 66 is actuated to place the lines 65 and 68 in communication and to connect the lines 67 and 69. Oil under pressure thus flows into the upper end of the cylinder, the lower end is connected to exhaust, and, therefore, the piston moves down. Thus, the electrodes are brought towards each other. Upon energization of a solenoid 71, the four-way valve is actuated to connect the pressure line 65 to the line 67 and the line 68 to the low pressure line 69. With this arrangement the piston moves up in the cylinder to separate the electrodes.

For the purpose of controlling the pressure acting on the piston and in consequence the force exerted on pieces between the electrodes, pressure relief valves are introduced into the hydraulic system. A relatively high pressure relief valve 72 of the constant pressure type is connected in the line 65 and, through a pipe 73, to the low pressure line 69. In the system illustrated, this relief valve is set to maintain a pressure in the line 65 of approximately one thousand pounds per square inch, that is, the valve opens the line 65 to the low pressure line 69 above this pressure. This is a balanced type of relief valve of a kind well known in the art and in which the valve is acted upon by the pressure in the line and opens the high pressure line to the low pressure only sufficiently to prevent the pressure exceeding that for which it is set. That is to say the valve does not open wide but rather throttles so as to prevent the pressure from exceeding the setting without causing the pressure to drop below the setting.

Another relief valve 74 of the same kind is introduced in a by-pass line 75 which by-pass line extends between the high pressure line 65 and the low pressure line 69. This relief valve 74, in the system illustrated, is adjusted to open when the pressure in the line 65 exceeds approximately three hundred and fifty pounds per square inch. When this valve is operating, the pressure in the line 65 cannot exceed, and it is held at a pressure of three hundred and fifty pounds per square inch. In the line 75, however, there is provided a cut-off valve 76 which, when actuated, serves to close the by-pass 75 and so render the relief valve 74 inoperative to relieve or control the pressure in the high pressure line 65. The cut-off valve 76, is actuated through an electrically energized solenoid 77. Thus, while the valve 76 remains open the relief valve 74 operates to control the pressure in the high pressure line 65. When, however, the valve 76 is closed, which is effected by the energization of the solenoid 77, the valve 74 becomes ineffective and the pressure in the line 65 is controlled by the relief valve 72 which becomes effective.

Figure 2:
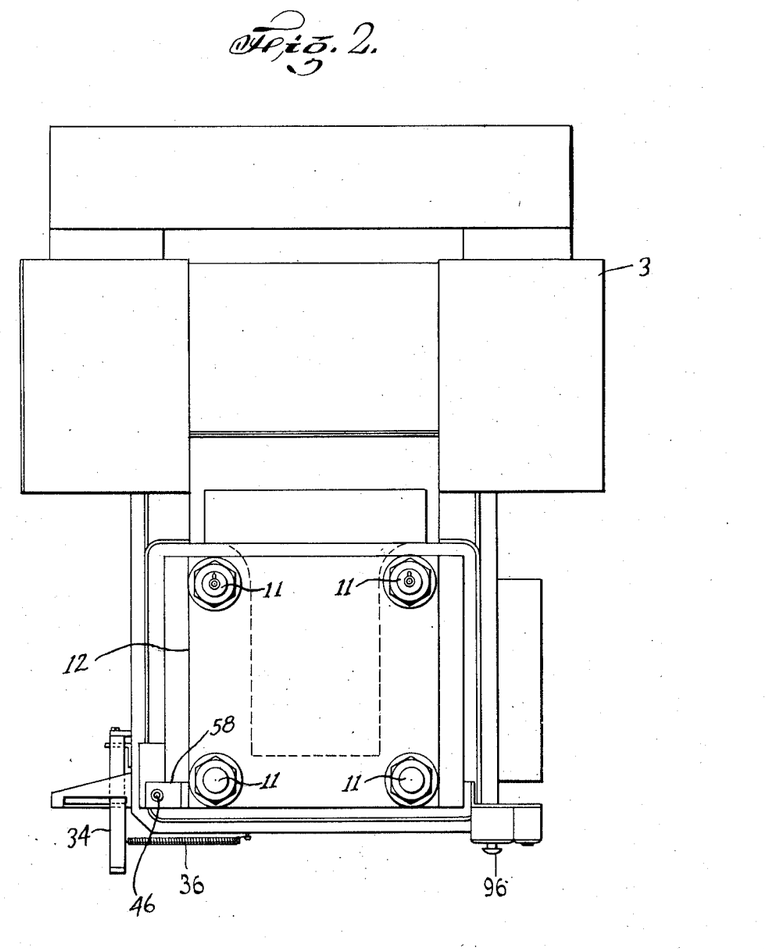
Fig. 2 which is a plan of the same.

For the purpose of conserving power, the hydraulic system is arranged so that in the position in which the electrodes are separated, only sufficient pressure is maintained to hold the guide rods in their uppermost position. To this end, there is utilized an unloading valve 78 which serves to vent the relief valve 72 and thus effect an imbalance in this valve so that the valve relieves the pressure in the line 65 at a very low pressure. The unloading valve 78 is mounted (Figs. 1 and 2) on the base 1. This is a piston type valve and a valve rod 79 extends from the valve. The valve 78 is positioned on the base 1 such that in the uppermost position of the guide posts, the bottom plate 18 engages the valve rod 79 and opens the valve. Mounted adjacent the valve 78, there is a pressure adjusting valve 80. These valves are interconnected and connected into the system as follows (Fig. 5): One side of the valve 78 is connected by a pipe 81 to the head or upper end of the cylinder 19. The other side of the valve is connected by a pipe 82 to one side of the pressure adjusting valve. The other side of the pressure adjusting valve 80 is connected by a pipe 83 to the vent of the relief valve 72. When the guide posts are in their uppermost position and the plate 18 has actuated the valve 78, the line 82 is connected through the valve 78, cylinder 19 and valve 66 to the low pressure line 69. Thus, oil from one side of the balanced relief valve 72 may flow through the pressure adjusting valve 80 and to the low pressure line. In this way an imbalance in the valve 72 is effected, relieving the pressure on this side of the valve. If the pressure on one side of the relief valve 72 were totally relieved, the pressure in the line 65 and in consequence, in the line 67 and on the bottom of the piston would like-wise be totally relieved and the guide posts, top plate and upper electrode would move down under their own weight. It is for this reason that the valve 80 is provided. By adjusting the valve 80, the valve 72 may be vented just sufficiently to maintain the desired pressure in the lower end of the cylinder 19 so that the guide posts are maintained in their uppermost position. This arrangement, while the welder is inoperative or the electrodes separated, reduces the load on the pump to a minimum and so conserves power, reduces wear on the equipment and avoids overheating of the oil.

The pressures mentioned above are for a particular welding operation and may vary in accordance with the nature of the pieces to be welded. In the hydraulic system illustrated suitable pipe lines 86 are utilized for carrying leakage from the various valves and instruments to the low pressure line and so to the reservoir.

In the operation, the operator presses one button and the welder goes through its cycle of operation. When the head has applied pressure on the pieces between the electrodes, a pressure switch 87 in combination with a time delay initiates the welding current. The limit switches then control the application of higher pressure and the termination of the welding current. The termination of the welding current initiates a time delay which after the lapse of a predetermined time causes the head to lift. At the top of the stroke, the pump unloads and everything is reset for another cycle. This automatic control is illustrated diagrammatically in Fig. 6.

Figure 6:
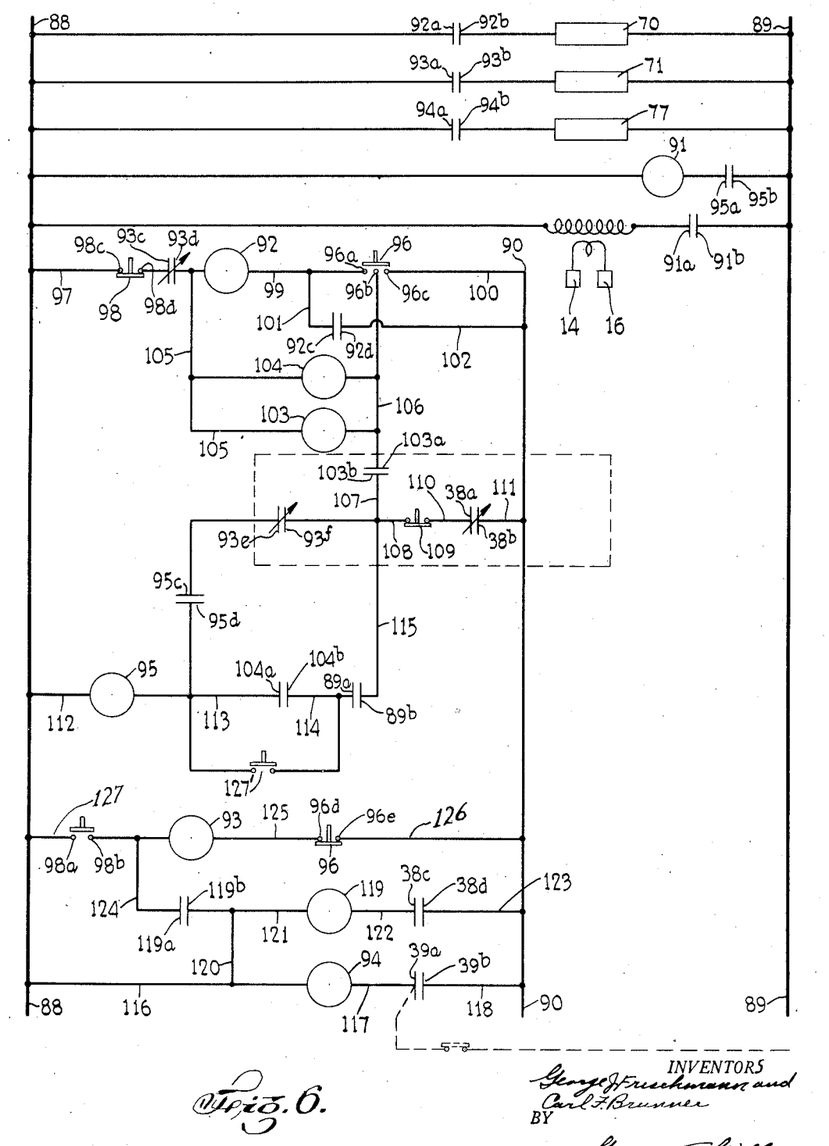
Fig. 6 which is a wiring diagram of the electrical control circuits.

Current for the system is taken from a 110/220 volt, alternating current supply, represented by the line wires 88 and 89 and the neutral 90. The solenoids 70 and 71 for operating the four-way valve 66, the solenoid 77 for actuating the valve 76, a circuit breaker 91 for controlling the current to the primary of the transformer 3, and the primary of the transformer 3 are, when in circuit, connected across the line wires 88 and 89. The remaining elements in the system are connected, when in circuit, between the line wire 88 and the neutral 90.

In the system illustrated, the solenoid 70 for effecting operation of the four-way valve 66, in a manner to connect the lower end of the cylinder to low pressure and the head end to the pressure side, and so effect forward movement of the electrode shoe 14, is connected across the line through normally open contacts 92a and 92b controlled by a relay 92. The solenoid 71 through which reverse movement of the electrode shoe 14, movement away from the electrode shoe 6, is effected is connected across the line through the normally open contacts 93a and 93b of a relay 93. In like manner, the solenoid 77 of valve 76 is connected across the line through the normally open contacts 94a and 94b of a relay 94; the circuit breaker 91 is connected across the line through normally open contacts 95a and 95b of a relay 95; and the primary of the transformer 3 is connected across the line through the normally open contacts 91a and 91b of the circuit breaker 91.

To start the forward or downward movement of the electrode shoe, the relay 92 is energized to effect closing of the contacts 92a and 92b. This is effected through a normally open push button switch 96 having contacts 96a, 96b and 96c that are bridged when the push button is pressed to close the switch. When this occurs, relay 92 is connected across wires 88 and 90 as follows, a wire 97 connected to wire 88, a normally closed push button switch 98, normally closed contacts 93c and 93d of relay 93, relay 92, a wire 99, contacts 96a and 96c of switch 96 and a wire 100 to the neutral 90. When the relay 92 is thus energized, contacts 92a and 92b are closed. Also contacts 92c and 92d of relay 92 are closed. Upon closing, these latter contacts complete a hold-in circuit for the relay 92, bypassing the switch 96, as follows: wire 99, a wire 101, contacts 92c and 92d, and a wire 102 to the neutral 90.

In addition to effecting the energization of relay 92 the closing of the switch 96 effects the energization of a relay 103 and a time delay relay 104. The circuit to the relay 103 is through the normally closed, relay contacts 93c and 93d of relay 93, a wire 105, relay 103, a wire 106 connected between relay 103 and contact 96b of switch 96, contact 96c and wire 100 to wire 90. The time delay relay 104 is connected across the wires 105 and 106 in parallel with the relay 103 and is so energized upon energization of relay 103. Upon energization, relay 103 closes its normally open contacts 103a and 103b and so completes a hold-in circuit, bypassing the switch 96, for itself and the time delay relay 104. This circuit includes the wire 106, contacts 103a and 103b, a wire 107, a wire 108, a normally closed push button stop switch 109, a wire 110, normally closed limit switch contacts 38a and 38b of switch 38, and a wire 111 to the neutral 90. After a time delay, for which the time delay relay 104 is set, this relay closes its normally open contacts 104a and 104b.

By the foregoing action, the electode shoe 14 has been brought down and exerts pressure upon the pieces placed between the electrodes. When this pressure reaches a predetermined value, the pressure switch 89 is actuated and closes its contacts 89a and 89b. When both the time delay relay contacts 104a and 104b and the pressure switch contacts 89a, 89b are closed, a circuit is completed to the circuit breaker relay 95 as follows: line wire 88, a wire 112, relay 95, a wire 113, contacts 104a, 104b, a wire 114, contacts 89a, 89b, and a wire 115 to line-connected wire 108. The circuit breaker relay thus connected in circuit closes its normally open contacts 95a, 95b and so effects the energization of the circuit breaker 91. In addition the normally open contacts 95c and 95d of relay 95 are closed and complete a hold-in circuit, bypassing the pressure switch and time delay relay contacts.

The circuit breaker contacts 91a, 91b are thus closed and the primary of the transformer 3 is connected across the line 88—89. Current is thus induced in the secondary and flows through the pieces between the electrodes. This is a heavy current and the pieces become heated in the weld area. The metal becomes plastic and the electrode shoe 14 moves closer to the electrode shoe 6 under the pressure applied. This movement effects the actuation of the limit switches, first the limit switch 39 and then the limit switch 38.

When the switch 39 is actuated, its normally open contacts 39a, 39b are closed. Upon closing, the high pressure relay 94 is energized through the following circuit: line wire 88, a wire 116, relay 94, a wire 117, contacts 39a, 39b and a wire 118 to neutral 90. Contacts 94a, 94b of relay 94 are thus closed and the solenoid 77 of valve 76 is energized. The valve 76 closes and renders the pressure relief valve 74 inoperative. The pressure in the system and acting on the piston in the cylinder 19 is thus controlled by the high pressure relief valve 72.

Upon slight further movement of the electrode 14, past the point of actuation of the limit switch 39, in some instances ten one thousandths of an inch, the switch 38 effects the cutting off of the welding current and initiates a circuit to a time delay relay 119 which controls the reverse or upward movement of the electrode shoe 14. This action is effected, upon the actuation of switch 38 by separating the normally closed contacts 38a and 38b thereof and closing the normally open contacts 38c and 38d thereof. Upon opening, the contacts 38a, 38b break the circuit to the relay 95, which circuit, as above described, includes these contacts. Thus, the circuit to the circuit breaker 91 is broken at the contacts 95a, 95b, the circuit breaker 91 is de-energized, and the circuit to the primary of the transformer 3 is broken at the contacts 91a, 91b.

When the contacts 38c and 38d close, the circuit initiated to the time delay relay 119 is as follows: line wire 88, wire 116, a wire 120, a wire 121, relay 119, a wire 122, contacts 38c, 38d, and a wire 123 to the neutral 90. Relay 119, after the time delay for which it is set, a time sufficient to complete the weld and start the cooling of the metal, closes its normally open contacts 119a, 119b. This completes a circuit through the reverse relay 93 as follows: line wire 88, wires 116, 120, 121, contacts 119a, 119b, a wire 124, relay 93, a wire 125, normally closed contacts of the push button switch 96, and a wire 126 to the neutral 90.

Upon the opening of the contacts 38a and 38b, the circuit to the relays 103 and 104 was broken. Upon energization of relay 93, the circuit to the relay 92 is broken at the contacts 93c, 93d of relay 93. De-energization of relay 92 breaks the circuit to the forward solenoid 70 at the contacts 92a, 92b. Also energization of relay 93, closes the circuit to the reverse solenoid 71 of the four-way valve 66. Thus, the valve is actuated to connect the lower end of the cylinder 19 to the high pressure line, and the upper end of the cylinder to the low pressure or exhaust. The piston thus moves upwardly, moving the electrode shoe 14 away from the electrode shoe 6. Also, as the ram plate moves upwardly the switches 38 and 39 are released and resume their normal positions.

When the ram plate reaches its uppermost position, the unloading valve 78 is actuated and the system is in its initial relation and ready. Upon the pressing of the push button switch 96, the circuit to the reverse relay 93 is broken at the contacts 96d, 96e. As the time delay relay 119 is now de-energized, through the reopening of contacts 38c, 38d of switch 38, the relay 93 remains de-energized until again energized in the cycle of operation.

The push button switch 98 is provided with normally open contacts 98a, 98b through which a circuit may be completed to the reverse relay 93 so that at any time during the cycle of operation, the electrode 14 may be raised. When the switch 98 is actuated, the forward action in the cycle is arrested by the breaking of the control circuit at the normally closed contacts 98c, 98d and a circuit is completed to the reverse relay as follows: wire 88, a wire 127, contacts 98a, 98b of switch 98, reverse relay 93, wire 125, normally closed contacts 96d, 96c of switch 96 and wire 126 to neutral 90. Whenever the relay 93 is energized, the hold-in circuit for the relay 95 is broken at the contacts 93e and 93f of relay 93. Similarly, the welding current may be cut off at any time by the actuation of the push button switch 109. Another push button 127' is provided by means of which the welding current may be initiated independently of the time delay relay 104. This switch is in a circuit parallel with the contacts 104a, 104b of the relay 104 and when closed bypasses these contacts. These manual controls are also useful for set up and trial purposes.

The operation of the welder is as follows: The operator places the pieces, such as the pieces 21 and 22 (Fig. 3) in the lower electrode with the edges at which the pieces are to be welded in contact. He then moves the safety-lock operating handle to the left (Fig. 1) which releases the safety-lock. At the same time, he presses the push button 96. Upon pressing the push button 96, relay 92 is energized and closes the circuit to the solenoid 70. The valve 66 is thus actuated to interconnect the cylinder 20 with the high pressure and low pressure lines such that the piston moves down in the cylinder. The upper electrode is thus brought down, receives the upper of the pieces, the piece 21, and presses the pieces together in the edge to edge relation. The guide pins 9 enter complementary openings in the upper electrode and position the electrodes as they approach each other.

When the electrodes are in engagement with the pieces and exert a predetermined pressure thereon, and the time delay relay 104 has operated, the primary of the transformer 3 is connected across the line 88—89. As the upper electrode moves down, the contact blades 16 and 17 are engaged. A circuit is therefore completed from one side of the transformer secondary, lower electrode shoe 6, lower electrode 7, piece 22, piece 21, upper electrode 14, upper electrode shoe 13 and contact blades 16 and 17 to the other side of the secondary of the transformer. The welding current thus flows through the pieces 21 and 22 in the area at which the weld is to be effected.

During the foregoing operations, the shut-off valve 76 is open. In consequence, the relief valve 74 determines the pressure in the high pressure line 65 and the force or pressure exerted on the pieces between the electrodes. This condition maintains while the pieces are being heated in the weld area and until the metal thereof becomes sufficiently plastic so that under the pressure exerted on the pieces, the metal flows.

As the top plate moved down, the head of the adjusting screw 57 engaged the operating collar 56 and the control rod was moved slightly but insufficiently, though nearly so, to actuate the switch 49. When the metal of the pieces is heated to plasticity and the upper electrode and ram plate 12 move slightly under the give of the metal of the pieces, the switch 39 is actuated. The shut-off valve 76 is instantaneously closed and the high pressure acts on the piston in the cylinder 20. Under this high pressure the metal of each piece is caused to flow into the other, the two pieces being quickly moved together until the upper electrode is stopped by the upper electrode shoe engaging the sizing blocks 10.

Immediately following the application of high pressure, the cam 44 actuates the switch 38. This opens the circuit to the relay 95 and de-energizes the relay. As a consequence, the circuit breaker 91 is de-energized, the welding current cut off and the time delay relay 119 is energized.

The weld is completed and as the metal begins to cool the time delay relay operates. By this action the solenoid 70 is de-energized and the solenoid 71 energized. The valve 66 is thus actuated to raise the piston in the cylinder and so separate the electrodes. The welded piece, consisting of the pieces 21 and 22 welded together, may then be removed from the welder.

When the bottom plate 18 moves to its uppermost position, it actuates the unloading valve 78. In the manner previously described this acts to relieve the pump 63.

The welder described above is suitable for continuous operation. The operating mechanism is comparatively simple and the pressure on the pieces being welded may be accurately controlled in relation to relative position of the electrodes and the progress of the weld. As arranged and constructed the electrodes are accurately positioned in all relative positions and the pressure exerted on the pieces to be welded is uniformly distributed.

It will be obvious that various changes may be made by those skilled in the art in the embodiment of the invention illustrated in the drawings and described in detail above within the principle and scope of the invention as expressed in the appended claims.

I claim:

1. An electric welder of the type described comprising in combination a base, four posts slidably mounted in and extending from the base, an electrode shoe supported on the base among said posts, a plate secured to the ends of said posts extending from the base, an electrode shoe mounted on the plate among the posts, another plate secured to the other ends of said posts, and means for acting on said latter plate to effect movement of the posts in two directions and throughout their limit of movement.

2. An electric welder of the type described comprising in combination a base, four posts slidably mounted in and extending from the base, an electrode shoe supported on the base among said posts, a plate secured to the ends of said posts extending from the base, an electrode shoe mounted on the plate among the posts, another plate secured to the other ends of said posts, and hydraulically actuated means for acting on said latter plate to effect movement thereof toward and away from the base.

3. An electric welder of the type described comprising in combination two relatively movable electrode supports, pressure actuated means for effecting relative movement of the supports toward and away from each other, means for applying pressure of one value to said pressure actuated means to effect movement of the electrode supports toward each other and for effecting a pressure engagement of pieces between electrodes carried by the electrode supports, means for supplying welding current and control means therefor including a pressure actuated switch and a time delay switch arranged to conjointly control the start of the flow of welding current, additional means for cutting off the welding current, and means operative immediately upon the take-up as the weld is being effected for increasing the pressure applied to said pressure actuated means.

4. An electric welder of the type described comprising in combination two relatively movable electrode supports, pressure actuated means for effecting relative movement of the supports toward and away from each other, means for applying pressure of one value to said pressure actuated means to effect movement of the electrode supports toward each other and for effecting a pressure engagement of pieces between electrodes carried by the electrode supports, means for supplying welding current, means operative upon slight relative movement of the electrode supports on the take-up as the weld is being effected for increasing the pressure applied to said pressure actuated means, additional means operative upon slight additional relative movement of the electrode supports for cutting off the welding current, and common actuating means therefor, and means for effecting reverse movement of the electrode supports after a predetermined time delay following the cutting off of the welding current.

5. An electric welder of the type described comprising in combination a base arranged to support an electrode, posts extending from and slidably mounted in said base, a plate secured to the ends of the posts above the base and arranged to support another electrode, another plate secured to the posts below the base, and pressure actuated means below the base connected to said last mentioned plate for effecting movement of the electrode carried by said first mentioned plate both toward and away from the base.

6. An electric welder of the type described comprising in combination a base arranged to support an electrode, posts extending from and slidably mounted in said base, a plate secured to the ends of the posts above the base and arranged to support another electrode, another plate secured to the posts below the base, a cylinder below the base and mounted thereon substantially centrally of said last mentioned plate, a piston within the cylinder and a piston rod extending from the piston and connected to the plate for effecting movement of the electrode carried by said first mentioned plate toward and away from the base.

7. An electric welder of the type described comprising in combination a base arranged to support an electrode, posts extending from and slidably mounted in said base, a plate secured to the ends of the post above the base and arranged to support another electrode, another plate secured to the posts below the base, pressure actuated means below the base connected to said second mentioned plate for moving the first mentioned plate towards the base, restraining means normally positioned below said second mentioned plate for restraining downward movement thereof under the action of said pressure actuated means and manually operative means acting directly thereon for releasing said restraining means.

8. An electric welder of the type described comprising in combination two relatively movable electrode shoes, means for effecting relative movement of the electrode shoes, means for supplying electric current to electrodes carried by the electrode shoes, and control means including means for actuating said electrode shoe moving means for effecting movement of the electrode shoes toward each other, means operated in accordance with the relative position of the electrode shoes for cutting off the current to the electrode shoes and means operated concomitantly with the cutting off of the current to the electrode shoes for initiating reverse relative movement of the electrode shoes including means for delaying the reverse moment of the electrode shoes for a predetermined time interval.

9. An electric welder of the type described comprising in combination two relatively movable electrode shoes, means for effecting movement of the electrode shoes, means for supplying electric current to electrodes carried by the electrode shoes, and means for automatically controlling the operation of the welder including means for effecting actuation of said electrode shoe moving means to effect relative movement of the electrode shoes towards each other, means operated in accordance with the relative position of the electrode shoes for cutting off the current supply thereto, and means operative after a predetermined time interval following the cutting off of the current for effecting actuation of said electrode shoe moving means to effect relative movement of the electrode shoes away from each other.

10. An electric welder of the type described comprising in combination two relatively movable electrode supports, hydraulically actuated means for effecting relative movement of the electrode supports toward and away from each other, a pump for supplying fluid under pressure for said hydraulically actuated means, means for controlling the pressure supplied by the pump including constant pressure relief valves and a cut-off valve for one of said constant pressure relief valves and control means for said cut off valve including means operative upon movement of the electrode support on the take-up as a weld is effected.

11. An electric welder of the type described comprising in combination a bed plate, a ram plate movable toward and away from the bed plate, pressure actuated means for moving the ram plate, means for applying a pressure of one value to said pressure actuated means to effect movement of the ram plate towards the bed plate, means operative for increasing the pressure applied to said pressure actuated means, and control means therefor including means acted upon directly by the ram plate.

12. An electric welder of the type described comprising in combination two relatively movable electrode supports, means for effecting relative movement of the electrode supports toward and away from each other, control means, and an actuating element for said control means positioned to be engaged by one of said relatively movable electrode supports.

13. An electric welder of the type described comprising in combination two relatively movable electrode supports, electrodes carried by the supports, means for effecting movement of the electrode supports, means for supplying electric current to the electrodes, means for automatically controlling the operation of the welder including means for effecting actuation of said electrode support moving means to effect relative movement of the electrode supports toward each other, and means operated in accordance with the relative position of the electrode supports for cutting off the current supplied thereto including a control element and actuating means therefor positioned to be engaged by one of said relatively movable electrode supports.

14. An electric welder of the type described comprising in combination two relatively movable electrode supports, electrodes carried by the supports, pressure actuated means for effecting relative movement of the electrode supports, means for supplying electric current to the electrodes, means for automatically controlling the operation of the welder including means for effecting actuation of said electrode support moving means to effect relative movement of the electrode supports toward each other, means for cutting off the current supply to the electrodes, means for affecting said pressure actuated means and control means for said last two mentioned means positioned to be engaged by an electrode support.

GEORGE J. FRISCHMANN.
CARL F. BRUNNER.